United States Patent
Cingal et al.

(10) Patent No.: US 11,371,468 B2
(45) Date of Patent: Jun. 28, 2022

(54) SUPPLY SYSTEM FOR SUPPLYING A ROCKET ENGINE

(71) Applicant: ARIANEGROUP SAS, Paris (FR)

(72) Inventors: Benoît Mathieu André Cingal, Vernon (FR); Philippe Becret, Asnieres-sur-Seine (FR); Mathieu Henry Raymond Triger, Vernon (FR)

(73) Assignee: ARIANEGROUP SAS, Paris (FR)

( * ) Notice: Subject to any disclaimer, the term of this patent is extended or adjusted under 35 U.S.C. 154(b) by 0 days.

(21) Appl. No.: 16/636,234

(22) PCT Filed: Aug. 21, 2018

(86) PCT No.: PCT/FR2018/052085
§ 371 (c)(1),
(2) Date: Feb. 3, 2020

(87) PCT Pub. No.: WO2019/038501
PCT Pub. Date: Feb. 28, 2019

(65) Prior Publication Data
US 2020/0386190 A1 Dec. 10, 2020

(30) Foreign Application Priority Data
Aug. 24, 2017 (FR) ...................................... 1757849

(51) Int. Cl.
*F02K 9/56* (2006.01)
*F02K 9/50* (2006.01)
(Continued)

(52) U.S. Cl.
CPC .................. *F02K 9/56* (2013.01); *F02K 9/44* (2013.01); *F02K 9/50* (2013.01); *F02K 9/605* (2013.01); *F16L 55/052* (2013.01)

(58) Field of Classification Search
CPC ..... F02K 9/44; F02K 9/50; F02K 9/56; F02K 9/605; F16L 55/052
See application file for complete search history.

(56) References Cited

U.S. PATENT DOCUMENTS 3,286,882 A 11/1966 Tripp
5,085,343 A * 2/1992 Scarr ....................... F02K 9/605
220/560.1

(Continued)

FOREIGN PATENT DOCUMENTS

| FR | 2975440 A1 | 11/2012 |
|---|---|---|
| FR | 2975441 A1 | 11/2012 |
| WO | WO 2012156615 A2 | 11/2012 |

OTHER PUBLICATIONS

Swanson, Luke, Design Analysis of the Ares I POGO Accumulator, Aug. 5, 2009, AIAA/ASME/SAE/ASEE Joint Propulsion Conference & Exhibit (Year: 2009).*

(Continued)

*Primary Examiner* — Todd E Manahan
*Assistant Examiner* — Kyle Robert Thomas
(74) *Attorney, Agent, or Firm* — Bookoff McAndrews, PLLC

(57) ABSTRACT

A supply system for supplying a rocket engine with at least one propellant, the supply system comprising at least one supply circuit able to circulate the propellant, and at least one reservoir in fluid communication with the supply circuit via at least one communication pipe, so that a fluid contained in the reservoir can flow from the latter up to the supply circuit, and vice versa, via said at least one communication pipe, the reservoir being able to contain a volume of gas, and heating means able to vary the volume of gas in the reservoir, the heating means being configured to vaporize the propellant in the reservoir.

12 Claims, 3 Drawing Sheets

(51) Int. Cl.
    *F02K 9/60*         (2006.01)
    *F16L 55/052*    (2006.01)
    *F02K 9/44*         (2006.01)

(56) References Cited

U.S. PATENT DOCUMENTS

| | | | | |
|---|---|---|---|---|
| 6,231,008 | B1* | 5/2001 | Schwarting | B64G 1/402 |
| | | | | 244/135 C |
| 6,755,378 | B2* | 6/2004 | Capozzi | B64G 1/24 |
| | | | | 244/171.1 |
| 10,914,268 | B2* | 2/2021 | Le Gonidec et al. | F02K 9/44 |
| 2010/0218482 | A1 | 9/2010 | Greason et al. | |
| 2011/0005193 | A1* | 1/2011 | Pavia | F02K 9/972 |
| | | | | 60/206 |
| 2013/0196273 | A1* | 8/2013 | Mungas | F23K 5/20 |
| | | | | 431/11 |
| 2017/0226965 | A1* | 8/2017 | Le Gonidec | F02K 9/56 |

OTHER PUBLICATIONS

Engineering Toolbox, Thermal Conductivity of Metals, 2017 (Year: 2017).*

Larsen, Curtis, NASA Experience with Pogo in Human Spaceflight Vehicles, May 5, 2008 (Year: 2008).*

Snead, High thermal conductivity of graphite fiber silicon carbide composites for fusion reactor application, 2002, Journal of Nuclear Materials 307-311 (Year: 2002).*

International Search Report dated Dec. 17, 2018, in corresponding PCT Application No. PCT/FR2018/052085 (4 pages).

\* cited by examiner

SUPPLY SYSTEM FOR SUPPLYING A ROCKET ENGINE

CROSS-REFERENCE TO RELATED APPLICATION(S)

This application is the U.S. national phase entry under 35 U.S.C. § 371 of International Application No. PCT/FR2018/052085, filed on Aug. 21, 2018, which claims priority to French Patent Application No. 1757849, filed on Aug. 24, 2017.

FIELD OF THE INVENTION

The present invention relates to an improved supply system for supplying a rocket engine with at least one propellant.

STATE OF THE PRIOR ART

In the field of liquid-propelled rockets, the name "POGO effect" has been given to the entry into resonance of a propellant (hydraulic modes) in the rocket engine supply circuit with mechanical oscillations of the rocket. As the thrust of the rocket engine varies with the propellant flow rate provided by the supply circuit, and the propellant flow rate fluctuates with the engine thrust fluctuations, such entry into resonance may cause rapidly divergent oscillations, and therefore give rise to guidance difficulties, and even to damage up to the total loss of the payload, or even of the vehicle. Therefore, since the beginning of the development of the liquid propelled rockets, it has been very important to take all possible measures to limit or avoid the occurrence of this POGO effect.

The attenuation of this phenomenon is conventionally achieved by the presence of a capacitive-type correction system (SCP) in the supply circuit, making it possible to reduce the flow rate fluctuations in this circuit and to modify the hydraulic frequency of the assembly. An example of this system, described in patent WO2012156615 A2, involves a gas bubble (for example helium) trapped in a cavity in communication with the supply circuit via orifices. The compressibility of this helium bubble makes it possible to dampen the flow rate fluctuations in the supply circuit. The volume of the gas bubble is regulated so as to limit the impact of the pressure variations in the supply line on the performances of the system. This regulation uses a device for permanently injecting helium into the cavity and a system for withdrawing, by suction, and discharging helium in the supply circuit.

However, these devices have various drawbacks. Helium injected into the system is discharged into the supply system, and then ingested by the turbo-pump, which can cause dynamic instabilities. In addition, the helium is expensive, intrinsically but also significant carrying volume and mass. In addition, the volume of the bubble can only be regulated to a single value, unless using mechanically complex devices such as those described in patent FR2975440. However, the natural frequencies of the structure of the rocket (structure modes) vary during the flight, as the reservoirs are emptied, so that there is a risk that these modes enter into resonance with the hydraulic oscillations (hydraulic modes), despite the presence of this bubble.

Therefore, there is a need for a device that would allow overcoming, at least party, the above drawbacks.

PRESENTATION OF THE INVENTION

The present disclosure relates to a supply system for supplying a rocket engine with at least one propellant, the supply system comprising at least one supply circuit able to circulate the propellant, and at least one reservoir in fluid communication with the supply circuit, the reservoir being able to contain a volume of gas, and heating means able to vary the volume of gas in the reservoir, the heating means being configured to vaporize the propellant in the reservoir.

In the present disclosure, by "at least one propellant", it is understood that one or more propellant(s) can flow in the supply circuit in the liquid state.

The reservoir is in fluid communication with the supply circuit so that a fluid contained in the reservoir can flow from the latter up to the supply circuit, and vice versa. More specifically, the fluid can have a reciprocating movement between the reservoir and the supply circuit, allowing the hydraulic oscillations existing in the supply circuit to be transmitted to the reservoir. It is thus understood that this reservoir is a reservoir added to the supply circuit, the fluid communication between the latter and the reservoir taking place on an intermediate portion of the supply line, between the main reservoir of the rocket engine containing the propellant intended to supply the combustion chamber, and the combustion chamber. The fluid present in the reservoir can be the propellant in the liquid state circulating in the supply circuit, as well as a gas bubble formed substantially, if not exclusively, by the propellant in the gaseous state, present in the upper part of this reservoir.

The supply system further comprises heating means. By "able to vary the volume of gas in the reservoir", it is understood that these heating means are for example able to be regulated so as to raise the temperature within the reservoir, hence to cause the evaporation of the liquid propellant present in the reservoir, and therefore to increase the volume of the gas bubble also present in this reservoir. Thus, by manipulating the volume of this bubble, it is possible to modify the hydraulic frequency in the supply circuit, so as to make sure that this hydraulic frequency does not coincide with the frequency of the mechanical oscillations of the rocket, even if it varies during flight, thus avoiding the entry into resonance of the assembly. This device therefore makes it possible to preserve the mechanical integrity of the rocket, and to dispense with the use of helium or any other gas injection for the formation and regulation of the volume of this bubble. The risk of generating dynamic instabilities, caused by the discharge of this gas up to the turbo-pump, is thus limited, since at least part of the gas re-condenses once it is in the supply line. Furthermore, this device allows reducing costs compared to the variable-volume configurations such as those described in patent FR2975440.

In some embodiments, the reservoir and the heating means are at least partially separated from the supply circuit by a thermally conductive area.

The reservoir and the supply circuit can for example be separated by a wall or a metal bridge. This makes it possible to control the conduction between the reservoir and the supply circuit. Thus, it is possible to vary the volume of the gas bubble in a limited time, in the order of ten seconds for example, when it is necessary.

In some embodiments, the reservoir and the heating means are at least partially separated from the supply circuit by a thermally insulating area.

This thermally insulating area can comprise any type of thermally insulating material disposed between the reservoir and the supply circuit, or even comprise an area in which the reservoir and the supply circuit are separated by a space. This thermally insulating area makes it possible to limit the heat losses of the reservoir, by limiting the thermal influence of the supply circuit on the reservoir. The accuracy of the heating means is thus increased and the necessary thermal power is reduced, the impact of the temperature of the supply circuit being minimized.

In some embodiments, the reservoir communicates with the supply circuit by means of at least two communication pipes.

These at least two pipes make it possible to put the reservoir and the supply circuit into fluid communication.

In some embodiments, the supply circuit comprises a duct having an axial direction, and the reservoir is disposed radially around the supply circuit, relative to the axial direction.

For example, in some embodiments, the reservoir has a cavity, the cavity being radially offset relative to the axial direction, on one side of the supply circuit.

This disposition makes it possible to optimize the thermal insulation between the reservoir and the supply circuit, by limiting the proportion of surfaces of the reservoir and of the supply circuit opposite each other respectively.

According to another example, in some embodiments, the reservoir is annular and is disposed radially around the supply circuit relative to the axial direction.

This disposition makes it possible to obtain a more compact assembly, and thus to optimize the rigidity of the supply system. It also allows a more homogeneous flow in the supply circuit due to the symmetry of revolution.

In some embodiments, the heating means comprise at least one heating element on one face of the reservoir.

In some embodiments, the heating means comprise at least two heating elements on one face of the reservoir, the at least two heating elements being distributed along said face.

The heating element(s) may for example be in contact with the external face of the reservoir. Consequently, the heating of the reservoir cavity is carried out by conduction through the wall of the reservoir. The regulation of the volume of the gas bubble in the cavity can therefore be carried out by simple thermal transfer, without requiring the addition of a gas in the cavity.

In certain embodiments, the heating element(s) are electrical resistors.

When traversed by an electric current, these electrical resistors release heat transferred by conduction through the wall of the reservoir. The regulation of the volume of gas in the cavity of this device can therefore be carried out by a simple and inexpensive device.

In some embodiments, the heating element(s) are circuits each configured to circulate a hot fluid.

By "hot" is meant a temperature higher than the vaporization temperature of the propellant. These circuits can for example be ducts wound around the reservoir, in which a hot fluid circulates. The hot fluid can for example be withdrawn at different locations on the rocket engine. The supply of one or more additional fluids is therefore not necessary, which offers a cost-effective solution. Also in this case, the heat transfers are also made by conduction through the wall of the reservoir.

In some embodiments, the circuits are disposed inside the wall of the reservoir.

The circuits are thus produced at the same time as the reservoir wall during the manufacture of the latter, for example by additive manufacture. This allows minimizing the overall manufacturing costs of the supply system. Furthermore, the fact that the circuits are disposed in the wall of the reservoir makes it possible to optimize the heat transfers from these circuits up to the cavity of the device.

In some embodiments, the supply system includes an electronic control unit.

In some embodiments, the electronic control unit is configured to activate the heating elements independently of each other.

In some embodiments, the electronic control unit is configured to modulate the power sent on each of the heating elements independently of each other.

The electronic control unit can be of the ECU type. This unit allows for example, by a command from a user or in an automatic manner, activating or deactivating independently either or both of the heating elements. This allows controlling the activation of these heating elements as a function of the desired volume of gas in the reservoir cavity. It is thus possible to easily regulate the volume of the gas bubble in this cavity, and thus not to be limited to a single volume, unlike the existing solutions.

In some embodiments, the supply system includes a level measurement device for determining the level of a liquid/gas interface within the reservoir, the level measurement device being connected to the electronic control unit.

The level measurement device may include for example a plurality of temperature sensors, for indirectly estimating the level of the liquid/gas interface.

In some embodiments, the level measurement device is a level probe.

The level probe makes it possible to know directly and easily the level of the liquid/gas interface in the cavity, and therefore the volume of the gas bubble in this cavity.

In some embodiments, the electronic control unit is configured, as a function of the level of the liquid/gas interface within the reservoir determined by the level measurement device, to activate either or both of the heating elements, and/or deactivate either or both of the heating elements.

The level probe allows communicating, to the electronic control unit, the level of the liquid/gas interface in the cavity of the device, ideally in real time. As a function of a desired volume of gas, the electronic control unit can therefore control by itself the activation or deactivation of one or more heating element(s) based on the information communicated by the level probe, without external intervention of a user. Consequently, the volume of gas can be regulated in a closed loop, in an autonomous manner.

In some embodiments, the electronic control unit is configured to program in time the modulation of the power sent on each of the heating elements.

It is thus possible to set the ECU, and therefore the power supplying the heating elements in advance, as a function of the mission profile and of the envisaged flight conditions. This eliminates the need for level sensors or probes, and thus allows simplifying the device.

In some embodiments, the reservoir includes a double wall having an external wall and an internal wall of higher conductivity than the external wall.

Consequently, the thermal transfers between the heating elements and the propellant can be improved, while minimizing the thermal transfers between the external wall of the reservoir and the supply circuit. The volume of the gas bubble in the cavity can thus be regulated with more accuracy and in a more cost-effective manner.

BRIEF DESCRIPTION OF THE DRAWINGS

The invention and its advantages will be better understood upon reading the detailed description given below of various embodiments of the invention given by way of non-limiting examples. This description refers to the pages of appended figures, in which.

DETAILED DESCRIPTION OF EXEMPLARY EMBODIMENTS

Figure 1:
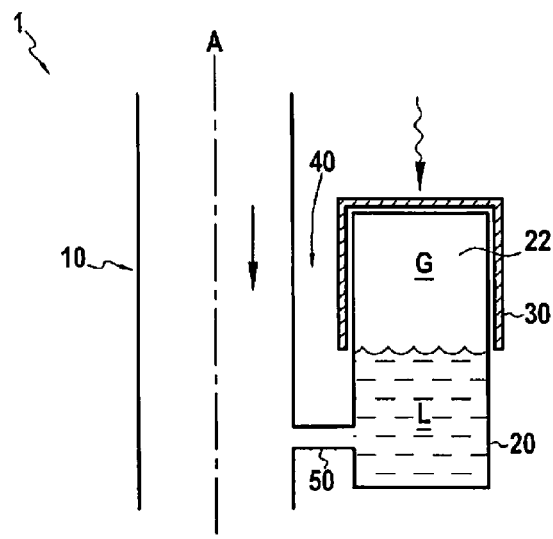
FIG. 1 represents a block diagram of a supply system.

FIG. 1 shows a block diagram of a supply system 1 for supplying a rocket engine with at least one propellant. The supply system 1 includes a supply circuit 10 extending along an axial direction A, in which the propellant L circulates in the liquid state along the direction of flow indicated by the arrow, between a main reservoir (not represented) in which the propellant intended to supply the engine is stored, and the combustion chamber (not represented). The supply system 1 also includes a reservoir 20, including a cavity 22. The reservoir 20 is in fluid communication with the supply circuit 10, by means of at least one communication pipe 50.

The cavity 22 contains, in its lower part, a certain volume of liquid propellant L communicating with the liquid propellant circulating in the supply circuit 10 via the pipe 50, and in its upper part, a gas bubble G, corresponding to the propellant in the vapor state. The hydraulic oscillations existing in the supply circuit 10 can thus be transmitted to the reservoir 20 via the pipe 50, and be damped by the presence of the gas bubble G.

The supply system 1 also includes heating elements 30, here disposed on an external face of the wall of the reservoir 20. The heating elements 30 are configured to supply heat on the external face of the reservoir 20. This heat is then transferred by conduction through the wall of the reservoir 20, up to the cavity 22, therefore increasing the temperature therein. This increase in temperature causes the evaporation of the liquid propellant L, and therefore the increase of the volume of the gas bubble G in the cavity 22.

Furthermore, apart from the presence of the communication pipe 50, through which the supply circuit 10 and the reservoir 20 are in fluid communication, the supply circuit 10 and the reservoir 20 are insulated from each other by a thermally insulating area 40. This thermally insulating area 40 allows accurately regulating the heating elements 30 to the desired temperature, by minimizing the impact of the temperature of the supply circuit 10, but also by minimizing the impact of the temperature of the reservoir 20 on the supply circuit 10.

Alternatively, the supply circuit 10 and the reservoir 20 can be separated from each other by a thermally conductive area. It can thus be possible to control the impact of the temperature of the supply circuit 10. This allows, when necessary, rapidly cooling the reservoir 20, and thus rapidly reducing the volume of the gas bubble G, by taking advantage of the temperature of the supply circuit 10.

Figure 2:
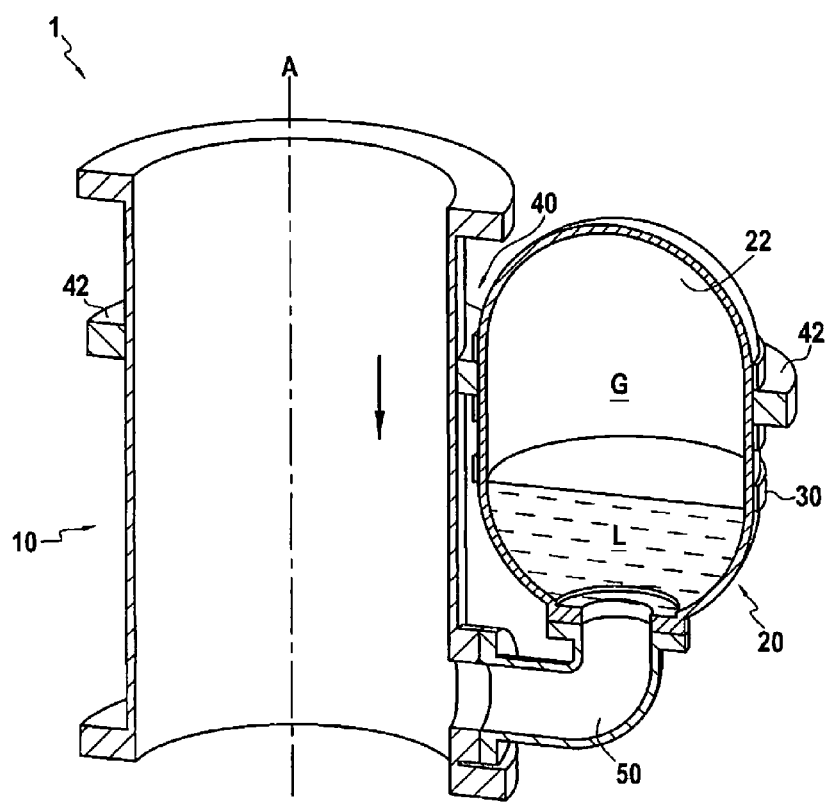
FIG. 2 is a perspective view of a first embodiment.

FIG. 2 represents a perspective view, illustrating a section in a section plane parallel to the axis A of the supply system 1, of a first embodiment of the invention. The supply circuit 10 has a substantially cylindrical structure about the axis A. According to this embodiment, the reservoir 20 has an oblong shape, including a substantially cylindrical trunk, and is radially offset relative to the supply circuit 10.

The reservoir 20 communicates with the supply circuit 10 only via the communication pipe 50. The reservoir 20 is disposed so that the axis of revolution of the latter is parallel to the axial direction A, so that the gas bubble G is naturally trapped in the part of the reservoir 20 opposite to the communication pipe 50.

In order to improve the mechanical strength of the system, at least one set of stiffeners 42 can be provided around the reservoir 20, on the external face of the latter, and on the external face of the supply circuit 10. The fact that the stiffeners 42 around the reservoir 20 and the supply circuit 10 are formed together in one piece gives the reservoir 20 a second connection point, in addition to the pipe 50, with the supply circuit 10. This allows improving the mechanical strength of the assembly. In addition, the stiffeners 42 can be formed of a thermally insulating material, so as not to create a thermal bridge between the supply circuit 10 and the reservoir 20. Thus, the supply circuit 10 and the reservoir 20 are insulated from each other by a thermally insulating area 40 that may comprise these stiffeners 42, and a space separating the reservoir 20 and the supply circuit 10, said space can include gas or be evacuated. Alternatively, when the supply circuit 10 and the reservoir 20 are separated from each other by a thermally conductive area, the stiffeners 42 can be formed of a thermally conductive material.

Figure 3A:
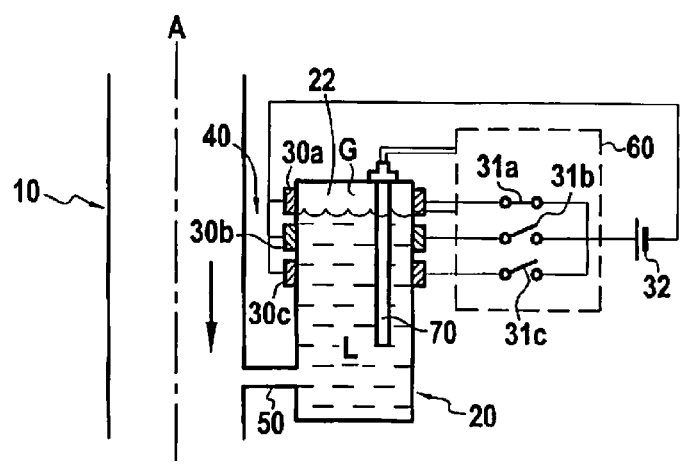
FIGS. 3A and 3B represent a cross-section of a first example of a supply system of the first embodiment, in two operating states.
Figure 3B:
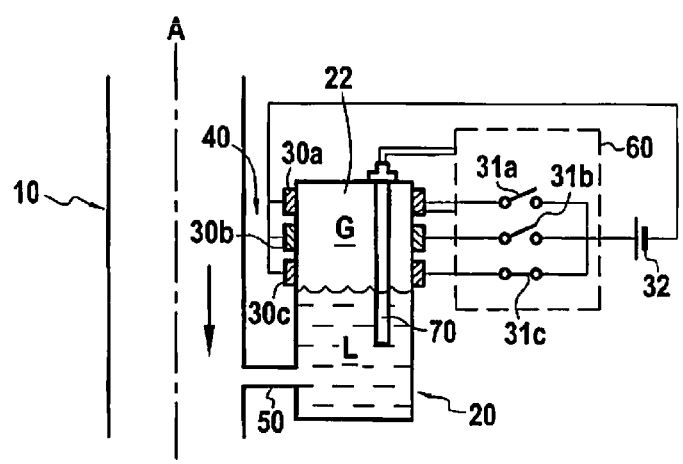

FIGS. 3A and 3B represent a cross-section of a first example of a supply system of the first embodiment. In this example, the heating elements 30 are electrical resistors. More specifically, a first electrical resistor 30a is disposed around the reservoir on an upper part thereof, here against its external wall. A second electrical resistor 30b is disposed under the first electrical resistor 30a, along the vertical direction, and a third electrical resistor 30c is disposed under the second electrical resistor 30b. The first electrical resistor 30a is connected to a first switch 31a, the second electrical resistor 30b is connected to a second switch 31b, and the third electrical resistor 30c is connected to a third switch 31c. Each switch 31a, 31b and 31c allows activating and deactivating each resistor 30a, 30b, 30c respectively, independently of each other. The switches can for example be interrupters. To do so, an electronic control unit 60, comprising the switches, controls the opening and closing thereof. In the example of FIG. 3A, the electronic control unit 60 controls the closing of the switch 31a, so as to put the first electrical resistor 30a in communication with energy source such as a battery 32. The latter can then electrically supply the first electrical resistor 30a, the latter thus heating the wall of the reservoir 20. In this same example, the switches 31b and 31c are in the open position, so that the battery 32 does not supply the second and third resistors 30b and 30c.

Furthermore, a level probe 70 can be provided in the cavity 22, and connected to the electronic control unit 60. This level probe 70 allows determining the position of the interface between the liquid phase L and the gaseous phase G of the propellant present in the cavity 22, and therefore the volume of the gas bubble. Consequently, as a function of a desired volume of gas bubble, corresponding to an operating speed of the rocket engine, and based on the information received by the level probe 70, the electronic control unit 60 can control the activation of one or several resistor(s) in order to move the liquid/gas interface to the desired height, and thus reach the desired volume of gas bubble.

In this example, in FIG. 3A, only the first electrical resistor 30a is activated, so that the liquid/gas interface in the cavity 22 is located at this resistor. To switch from the state of FIG. 3A to the state of FIG. 3B, in order to lower the level of the liquid/gas interface, and therefore to increase the volume of the gas bubble, the control unit 60 controls the opening of the first switch 31a so as to deactivate the first electrical resistor 30a. At the same time, the control unit 60 controls the activation of the third electrical resistor 30c, disposed on the lowest part of the reservoir 20 relative to the other electrical resistors, by closing the third switch 31c. The liquid/gas interface is thus lowered at this third electrical resistor 30c. It is also possible to control, prior to the activation of the third electrical resistor 30c, the activation of the second electrical resistor 30b. This allows effectively and accurately controlling the evolution of the volume of the gas bubble.

Although the example in FIGS. 3A and 3B includes three resistors, more resistors are possible. Thus, more generally, the liquid/gas interface can be lowered substantially at the lowest activated resistor.

Figure 4:
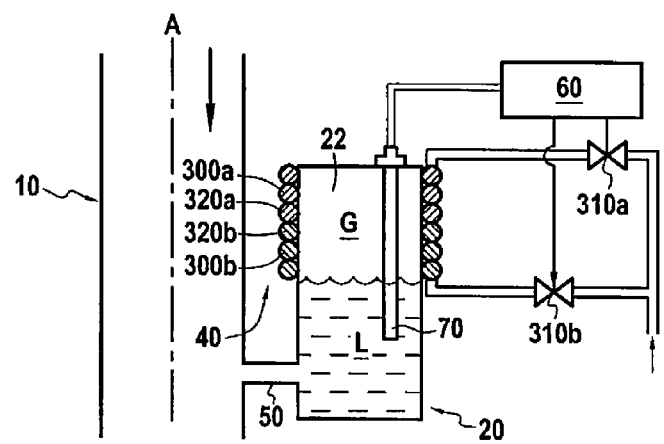
FIG. 4 represents a cross-section of a second example of a supply system of the first embodiment.

FIG. 4 represents a cross-section of a second example of a supply system of the first embodiment. In this example, the heating elements 30 are circuits in which a hot fluid circulates. The heat exchanges are therefore made by convective and conductive transfers between these circuits and the cavity 22. More specifically, a first circuit 300a is disposed around the reservoir on an upper part thereof, here against its external wall. A second circuit 300b is disposed under the first circuit 300a, along the vertical direction. The first circuit 300a is connected to a first valve 310a and to a fluid outlet 320a, and the second circuit 300b is connected to a second valve 310b and to a fluid outlet 320b. Each valve 310a and 310b allows supplying respectively the circuits 300a and 300b independently of each other, as a function of the desired volume of gas bubble, and of the information received by the level probe 70. To do so, the valves are connected to the electronic control unit 60, controlling the opening and closing of these valves. The electronic control unit can also regulate the flow rates of the hot fluid in either of the circuits 300a and 300b, according to the degree of opening of the valves 310a and 310b. The hot fluid may be hot gases withdrawn in the rocket engine, another propellant having a saturation temperature, relative to the considered pressures, higher than the propellant flowing in the supply circuit 10, or any other fluid allowing the heating of the reservoir 20 wall and the evaporation of the liquid propellant in the cavity 22. In the example represented in FIG. 4, the circuits 300a and 300b are tubes wound around the reservoir 20, against the external wall thereof. However, these tubes can also be disposed inside the wall of the reservoir 20. In addition, although the example in FIG. 4 includes two circuits, more circuits are possible. Furthermore, although in the example in FIG. 4, the same hot fluid allows selectively supplying either of the circuits, each of these circuits can also be supplied by a different hot fluid.

Figure 5:
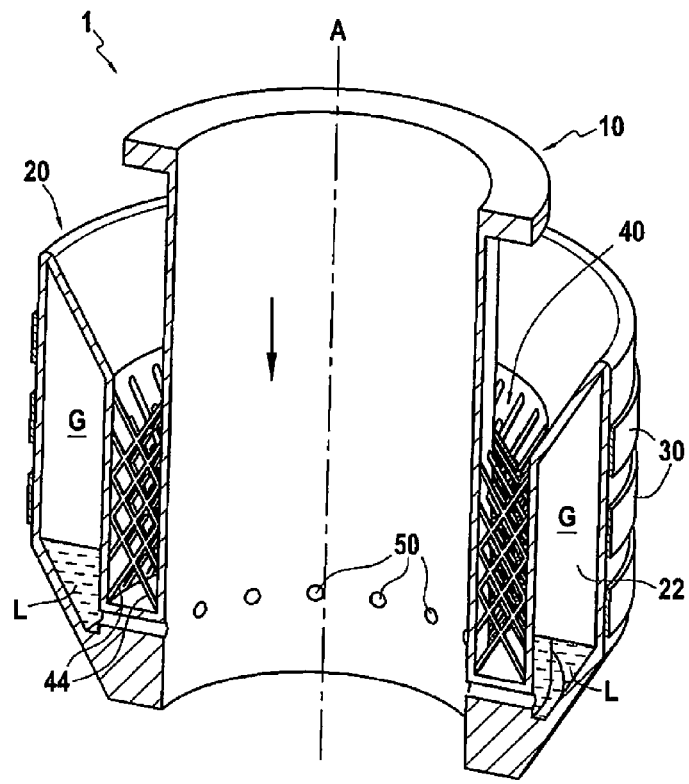
FIG. 5 is a perspective view of a second embodiment.

FIG. 5 represents a perspective view, illustrating a section in a section plane parallel to the axis A of the supply system 1, of a second embodiment. The supply circuit 10 has a substantially cylindrical structure about the axis A. According to this embodiment, the reservoir 20 has an annular shape, and is disposed radially around the supply circuit 10. The reservoir 20 communicates with the supply circuit 10 via a plurality of communication pipes 50 connected to a lower part of the reservoir 20.

The supply circuit 10 and the reservoir 20 are insulated from each other by a thermally insulating area 40. In this embodiment, this thermally insulating area 40 includes, in addition to a space that may include gas, vacuum, or a non-structural insulating material (for example foam) between the reservoir 20 and the supply circuit 10, a mesh structure 44, for example a honeycomb structure, mechanically connecting the supply circuit 10 and the reservoir 20. This mesh structure 44 has a low thermal conductivity. This mesh structure 44 allows improving the rigidity of the supply system 1, while controlling the heat losses in the cavity 22.

In the example of FIG. 5, the heating elements 30 are electrical resistors disposed around the reservoir 20 and over its entire circumference. However, circuits such as those described with reference to FIG. 4 can also be used as heating elements 30 in this embodiment. Furthermore, the operating mode of the supply system 1, for regulating the volume of the gas bubble G in the cavity 22, is the same as for the first embodiment, and will therefore not be repeated here.

Although the present invention has been described with reference to specific exemplary embodiments, it is obvious that modifications and changes can be made to these examples without departing from the general scope of the invention as defined by the claims. Particularly, individual characteristics of the various illustrated/mentioned embodiments can be combined in additional embodiments. In addition, although heating elements using conductive elements (electrical resistors) or convective exchangers have been presented, other conductive and convective solutions are possible, as well as heating elements operating by radiative or inductive exchanges. Consequently, the description and the drawings should be considered in an illustrative rather than restrictive sense.

It is also obvious that all the characteristics described with reference to one method can be transposable, alone or in combination, to one device, and conversely, all the characteristics described with reference to one device are transposable, alone or in combination, to one method.

The invention claimed is:

1. A supply system for supplying a rocket engine with at least one propellant, the supply system comprising:
   at least one supply circuit configured to circulate the at least one propellant from a main reservoir to the rocket engine,
   at least one reservoir in fluid communication with the supply circuit via at least one communication pipe branching off from the at least one supply circuit, so that the at least one propellant contained in the at least one reservoir can flow from the reservoir up to the at least one supply circuit, and vice versa, via said at least one communication pipe, the at least one reservoir configured to contain a volume of gas without helium, and
   heating means configured to vary the volume of gas in the at least one reservoir, the heating means being further configured to vaporize the at least one propellant in the at least one reservoir so as to lower a liquid/gas interface in the at least one reservoir.

2. The supply system according to claim 1, wherein the at least one reservoir and the heating means are at least partially separated from the at least one supply circuit by a thermally insulating area.

3. The supply system according to claim 1, wherein the at least one supply circuit includes a duct having an axial direction, and the at least one reservoir is disposed radially around the at least one supply circuit, relative to the axial direction.

4. The supply system according to claim 3, wherein the at least one reservoir has a cavity, the cavity being radially offset relative to the axial direction, on one side of the at least one supply circuit.

5. The supply system according to claim 3, wherein the at least one reservoir is annular and is disposed radially around the at least one supply circuit relative to the axial direction.

6. The supply system according to claim 1, wherein the supply circuit comprises a duct having an axial direction, and wherein the heating means includes at least two heating elements on one face of the at least one reservoir, the at least two heating elements being distributed along the axial direction on said one face.

7. The supply system according to claim 6, wherein the at least two heating elements are electrical resistors.

8. The supply system according to claim 6, wherein the at least two heating elements are circuits each configured to circulate a hot fluid.

9. The supply system according to claim 6, including an electronic control unit configured to activate the at least two heating elements independently of each other.

10. The supply system according to claim 9, including a level measurement device configured to determine a level of the liquid/gas interface within the at least one reservoir, the level measurement device being connected to the electronic control unit.

11. The supply system according to claim 10, wherein the electronic control unit is configured, as a function of the level of the liquid/gas interface within the at least one reservoir determined by the level measurement device, to activate either or both of the at least two heating elements.

12. The supply system according to claim 1, wherein the volume of gas contained in the reservoir is formed by the propellant in the gaseous state.

* * * * *